July 1, 1958     H. F. WILSON     2,841,468
RECOVERY OF URANIUM FROM CARBONATE LEACH LIQUORS
Filed June 14, 1957
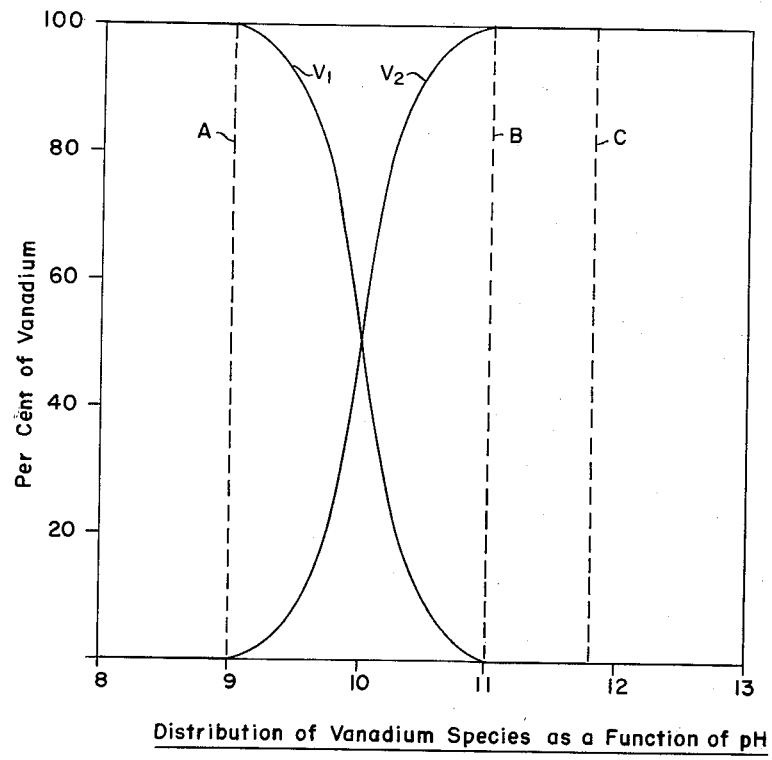
Distribution of Vanadium Species as a Function of pH
INVENTOR
HENRY F. WILSON
BY
ATTORNEY

2,841,468

RECOVERY OF URANIUM FROM CARBONATE LEACH LIQUORS

Henry F. Wilson, Maybell, Colo., assignor to the United States of America as represented by the United States Atomic Energy Commission Application June 14, 1957, Serial No. 665,873

2 Claims. (Cl. 23—14.5)

This invention relates to the recovery of uranium values from carbonate leach liquors and more particularly to the use of anion exchange resins in a selective method for recovering uranium values from carbonate leach liquors obtained in the leaching of vanadiferous uranium ores.

The use of aqueous solutions of alkali metal carbonates to leach uranium values from vanadiferous uranium ores, such as carnotite, has long been known as can be seen from U. S. Patents 808,839; 1,435,180; and 1,438,357. The leach liquors thus obtained contain both uranium and vanadium values. The alkali metal carbonate most usually employed in the leaching process is sodium carbonate, but many leaching solutions contain both sodium carbonate and sodium bicarbonate. Since the optimum pH for the carbonate leaching of uranium ores is 10 or less, the amount of alkali metal carbonate used in the leaching solutions is carefully controlled to yield leach liquors having a pH of 10 or below. The more recent developments in the carbonate leaching of uranium ores are reviewed in a "Summary of Carbonate Leaching of Uranium Ores" by Andrew J. Frank, a published report of the Atomic Energy Commission identified as ACCO-48.

Until recently it was common to recover the uranium values from these carbonate leach liquors by precipitation techniques. More recently it has been discovered that strong base quaternary amine anion exchange resins can be used to recover uranium values from carbonate leach liquors as shown in U. S. Patent No. 2,780,514 granted on February 5, 1957.

Among the strong base anion exchange resins found to be useful for recovering uranium values from carbonate leach liquors are the resins marketed under the names "Amberlite IRA-400," "Dowex-1," and "Dowex-2." "Amberlite IRA-400" is a strongly basic anion exchange resin containing quaternary ammonium groups prepared by reacting a tertiary amine with a chloromethylated copolymer of styrene and divinylbenzene as described in U. S. Patent No. 2,591,573. Information concerning the manufacture and uses of "Amberlite IRA-400" is also given in British Patent No. 654,706, in French Patent No. 988,486, and in U. S. Patents Nos. 2,578,937 and 2,578,938. The manufacture of "Dowex-1" is described in Example 2 of U. S. Patent No. 2,614,099, and the manufacture of "Dowex-2" is described in Example 4 of U. S. Patent No. 2,614,099. Further information concerning the manufacture, properties and uses of these two "Dowex" resins may be found in U. S. Patent No. 2,559,529 and in an article by Wheaton and Bauman on the "Properties of Strongly Basic Anion Exchange Resins" which appeared in volume 43 of Industrial and Engineering Chemistry at pages 1088 to 1093.

After an optimum amount of uranium values have been adsorbed by the anion exchange resin, they are removed therefrom by bringing the anion exchange resin into contact with a suitable eluting solution. Aqueous solutions of sodium chloride, ammonium chloride or ammonium nitrate from 1 to 2 molar in strength have frequently been used as eluants. Aqueous 10 to 20% solutions of ammonium carbonate and ammonium bicarbonate and 10% solutions of sodium bicarbonate have been used for this same purpose. Aqueous solutions of ammonium sulfate (1 to 4 M) and of ammonium bisulfate (1 M) have likewise been used for eluting uranium values from anion exchange resins.

This invention relates to improvements in ion exchange processes for the recovery of uranium and vanadium from carbonate leach liquors. These processes all make use of anion exchange resins of the strong base type which are capable of adsorbing uranium from carbonate solutions in the form of the anionic carbonate complex, $UO_2(CO_3)_3^{-4}$. This adsorption may be represented by the following anion exchange reaction.

$$4[RX] + UO_2(CO_3)_3^{-4} \rightarrow [R_4UO_2(CO_3)_3] + 4X^-$$

In this equation, brackets represent the resin phase, while $X^-$ represents any exchangeable anion originally present on the resin. Following adsorption of the resin, the uranium may be desorbed therefrom by the reversal of the reaction set forth in the above equation. This reversal is easily accomplished by providing a high solution concentration of $X^-$. Anions such as $HCO_3^-$, $Cl^-$, and $NO_3^-$ have been found effective in this desorption.

In the past, the adsorption of uranium by anion exchange resins from carbonate solutions, such as those obtained in the leaching of vanadiferous uranium ores, has been seriously impaired by the presence of soluble vanadium species. This impairment arises from the fact that these vanadium species exhibit a greater affinity for the resin than does the uranium complex, $UO_2(CO_3)_3^{-4}$. In cases where carbonate solution is continuously recycled for the leaching of fresh ore, the concentration of the soluble vanadium soon reaches levels which make ion exchange recovery of the uranium economically prohibitive due to excessive vanadium loading on the resin.

This invention has an object to provide a method of treating carbonate leach liquors derived from vanadiferous uranium ores so that the dissolved uranium values will be preferentially adsorbed by anion exchange resins while the vanadium values will be concentrated in the effluent liquor. Another object is to provide an economical and highly selective method for separately recovering uranium values and vanadium values from carbonate solutions. Other objects will appear hereinafter.

It has now been found that detrimental effect of vanadium on the adsorption of uranium from carbonate solutions may be overcome by a suitable adjustment of the pH of the carbonate solution. More particularly, it has been found that in carbonate solutions having a pH of from 10.8 to 11.8 the interfering vanadium species are converted to other species which do not compete with $UO_2(CO_3)_3^{-4}$ for the anion exchange resin. This effect of pH is readily apparent from a consideration of the data assembled in Table I below.

TABLE I

*Effect of pH on the adsorption of uranium and vanadium on anion exchange resin*

| pH Initial Solution | Resin Loading | |
|---|---|---|
| | g. $U_3O_8$/l. | g. $V_2O_5$/l. |
| 6.9 | 21.2 | 88.0 |
| 8.9 | 12.5 | 89.1 |
| 11.2 | 75.0 | 2.20 |

In obtaining the data recorded in the above table use was made of a carbonate leach liquor which had a pH of 9.35 and which upon analysis was found to contain 1.75 grams of $U_3O_8$, 1.05 grams of $V_2O_5$, 5.7 grams of $Na_2CO_3$, and 2.7 grams of $NaHCO_3$ per liter. In the first test recorded in the table above the pH of this liquor was changed to 6.9 by the addition of HCl thereto, and in the second test the pH of the liquor was lowered to 8.9 with HCl. In the third test the pH of the liquor was adjusted to 11.2 with caustic soda. In adjusting the pH of the carbonate leach liquor there was no visible precipitation of uranium at the pH of 11.2. Some visible precipitation, probably uranyl vanadate, occurred at pH 6.9. The anion exchange resin used in the tests was "Amberlite IRA-400." One hour contacts with 25 parts by volume of wet settled resin and 100 parts by volume of the test liquors with adjusted pH's were made until the effluent assays showed that the resin had reached saturation loading. The resin was then transferred to a column and eluted with 1 M $NaHCO_3$. The uranium and vanadium loadings were calculated from the pregnant eluate assays and volumes.

In the first two tests uranium saturation was obtained in 9 contacts. The tests were carried on through 33 contacts in order to obtain saturation loading of vanadium. Effluent assays indicated that uranium which loaded during the first 9 contacts was partially replaced by vanadium. Examination of the effluent assays from the third test showed that some vanadium was loaded during the first four contacts but as the resin approached saturation, uranium was replacing the vanadium. During the last 10 contacts the vanadium content of the effluent was greater than the feed.

In another test a feed solution was used which assayed 1.53 grams of $U_3O_8$, 1.17 grams of $V_2O_5$, 7.7 grams of $Na_2CO_3$, and 1.5 grams of $NaHCO_3$ per liter. The pH of this feed solution was adjusted to 10.8 by the addition of NaOH thereto. After enough of this solution had been brought into contact with "Amberlite IRA-400" so that equilibrium conditions had been established, it was found that the vanadium content of the tails solution was approximately the same as that of the feed solution, whereas the uranium in the tails solution during the loading cycles varied from 0.002 to 0.008 gram of $U_3O_8$ per liter. This showed that uranium was being selectively loaded on the resin.

In another example of applicant's invention a carbonate leach liquor analyzing 1.54 grams of $U_3O_8$, 0.37 gram of $V_2O_5$, 17 grams of $Na_2CO_3$ and 1.2 grams of $NaHCO_3$ per liter and having its pH adjusted to 10.9 was run through eight cells or banks containing "Amberlite IRA-400" which were arranged in series. The following table gives the analytical data collected at the time bank 1 was ready to have the uranium eluted therefrom.

TABLE II

| Bank | Resin Loading | | Effluent Solution Assays, g/l. | | | |
|---|---|---|---|---|---|---|
| | Lb. $U_3O_8$/ Cu. Ft. WSR | g. $V_2O_5$/l. WSR | $U_3O_8$ | $V_2O_5$ | $Na_2CO_3$ | $NaHCO_3$ |
| 1 | 3.30 | nil | 1.18 | .35 | 17.5 | 0.8 |
| 2 | 2.28 | 2.04 | .93 | .36 | | |
| 3 | 1.26 | 2.64 | .50 | .38 | 16.4 | 1.3 |
| 4 | .33 | 2.30 | .30 | .48 | 16.4 | 1.3 |
| 5 | .33 | 3.18 | .14 | .42 | 16.9 | 0.8 |
| 6 | .13 | 3.46 | .06 | .46 | 16.4 | 1.3 |
| 7 | .006 | 3.21 | .028 | .42 | 16.4 | 0.8 |
| 8 | .027 | 3.66 | .009 | .41 | 16.9 | 0.4 |

It is significant to note in the above data that the vanadium content of the effluent solutions was never substantially less than that of the feed solution whereas the uranium content of the effluent solutions constantly decreased from bank to bank. It is also noteworthy that vanadium loading on the resin in the banks tended to decrease as more leach liquor was sent through the bank.

It has been found that best results are obtained if the pH of the carbonate leach liquor is adjusted to 10.8 to 11.2 before it is brought into contact with the anion exchange resin for the recovery of uranium values.

It is of some interest to consider the present invention in relation to Figure 1, which is a gross oversimplification of the behavior of various pentavalent vanadium species as a function of pH. In this figure, $V_1$ represents those anionic vanadium species which are strongly adsorbed on anion exchange resins, while $V_2$ represents those vanadium species which are only weakly adsorbed. It is seen that below pH 9 (to the left of dashed vertical line A) the vanadium exists solely as species $V_1$; while above pH 11 (to the right of dashed vertical line B), it exists solely as species $V_2$. Vertical dashed line C represents the limit of stability of $UO_2(CO_3)_3^{-4}$. Above this pH (11.8), increasing amounts of insoluble uranates are precipitated by hydrolysis of $UO_2(CO_3)_3^{-4}$. Therefore, in the practice of the present invention, the pH of the carbonate is adjusted to be within the range of lines B and C, i. e., the pH range 11–11.8. Since the optimum pH for the carbonate leaching of uranium ores is 10 or below, addition of caustic will be necessary prior to ion exchange treatment of such leach solutions.

While the foregoing description has been concerned primarily with the recovery of uranium from carbonate solution, it should be stressed that a separation of uranium and vanadium from carbonate solutions may be achieved by the present invention. This separation allows one to selectively concentrate and recover uranium and vanadium from carbonate solutions by suitable pH adjustments prior to ion exchange treatment.

The present invention is particularly applicable to anion exchange processing of carbonate solutions containing uranium and vanadium. In fact, the adjustment of solution pH prior to ion exchange recovery of uranium from carbonate solutions containing vanadium will probably become standard practice in future plant operations. The present invention also provides a solution to the difficult problem of separating uranium and vanadium when they exist together in carbonate solutions.

Adjustment of the pH of carbonate solutions derived from vanadiferous uranium ores whereby uranium may be selectively adsorbed in the presence of vanadium on anion exchange resins is believed to be novel.

Resort may be had to such variations and modifications as fall within the spirit of the invention and the scope of the appended claims.

I claim:

1. A process of selectively recovering uranium values from a vanadiferous uranium ore which comprises leaching said ore with an aqueous solution of an alkali metal carbonate to obtain a pregnant leach liquor containing dissolved uranium and vanadium values and having a pH of less than 10, adjusting the pH of said leach liquor to lie within the range 10.8 to 11.8 by the addition of an alkali thereto, then bringing the leach liquor into contact with a strong base anion exchange resin whereby the uranium values are adsorbed thereon while the vanadium values largely remain in solution, and eluting the adsorbed uranium values from said anion exchange resin.

2. A process of selectively recovering uranium values from a vanadiferous uranium ore which comprises leaching said ore with an aqueous solution containing sodium carbonate and sodium bicarbonate to obtain a pregnant leach liquor containing dissolved uranium and vanadium values and having a pH of less than 10, adjusting the pH of said leach liquor to lie within the range 10.8 to 11.2 by the addition of sodium hydroxide thereto, then bringing the leach liquor into contact with a strong base quaternary amine anion exchange resin whereby the uranium values are adsorbed thereon while the vanadium values largely remain in solution, and eluting the adsorbed uranium values from said anion exchange resin.

References Cited in the file of this patent

UNITED STATES PATENTS

| | | |
|---|---|---|
| 808,839 | Haynes | Jan. 2, 1906 |
| 1,435,180 | Schlesinger | Nov. 14, 1922 |
| 1,438,357 | Blacker | Dec. 12, 1922 |
| 2,780,514 | Lutz | Feb. 5, 1957 |

OTHER REFERENCES

Atomic Energy Commission Document ACCO–48, June 18, 1954.